US008521731B2

(12) United States Patent
Broder et al.

(10) Patent No.: US 8,521,731 B2
(45) Date of Patent: Aug. 27, 2013

(54) SYSTEMS AND METHODS FOR QUERY EXPANSION IN SPONSORED SEARCH

(75) Inventors: Andrei Z. Broder, Menlo Park, CA (US); Evgeniy Gabrilovich, Sunnyvale, CA (US); Vanja Josifovski, Los Gatos, CA (US); Donald Metzler, Santa Clara, CA (US); Lance Riedel, Menlo Park, CA (US); Peter Ciccolo, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 529 days.

(21) Appl. No.: 12/169,782

(22) Filed: Jul. 9, 2008

(65) Prior Publication Data

US 2010/0010959 A1 Jan. 14, 2010

(51) Int. Cl.
*G06F 17/30* (2006.01)
(52) U.S. Cl.
USPC .......... 707/728; 707/745; 707/727; 707/729; 707/730; 707/796
(58) Field of Classification Search
CPC ................................. G06F 17/30; G06F 17/00
See application file for complete search history.

(56) References Cited

U.S. PATENT DOCUMENTS

| 4,435,780 | A | * | 3/1984 | Herrington et al. ........... 710/244 |
| 4,996,666 | A | * | 2/1991 | Duluk, Jr. .................... 365/49.1 |
| 5,010,478 | A | * | 4/1991 | Deran ................................. 1/1 |
| 5,283,894 | A | * | 2/1994 | Deran ............................ 707/704 |
| 5,349,675 | A | * | 9/1994 | Fitzgerald et al. ....... 379/102.01 |
| 5,524,240 | A | * | 6/1996 | Barbara et al. ................. 707/741 |
| 5,596,746 | A | * | 1/1997 | Shen et al. ............................ 1/1 |
| 5,699,523 | A | * | 12/1997 | Li et al. .......................... 709/238 |
| 5,832,452 | A | * | 11/1998 | Schneider et al. ................ 705/5 |
| 5,912,674 | A | * | 6/1999 | Magarshak .................... 345/440 |
| 5,920,859 | A |   | 7/1999 | Li |
| 5,926,535 | A | * | 7/1999 | Reynolds ................. 379/221.06 |
| 5,933,818 | A | * | 8/1999 | Kasravi et al. .................. 706/12 |
| 5,966,712 | A | * | 10/1999 | Sabatini et al. .............. 435/6.12 |
| 6,006,225 | A |   | 12/1999 | Bowman et al. |
| 6,009,428 | A | * | 12/1999 | Kleewein et al. ..................... 1/1 |
| 6,031,995 | A | * | 2/2000 | George ......................... 717/166 |
| 6,078,916 | A |   | 6/2000 | Culliss |
| 6,098,065 | A |   | 8/2000 | Skillen et al. |

(Continued)

FOREIGN PATENT DOCUMENTS

| EP | 1587010 | 10/2005 |
| JP | 09-245038 | 9/1997 |
| WO | WO2005013151 | 2/2005 |

OTHER PUBLICATIONS

U.S. Appl. No. 11/432,585: Application as filed, May 11, 2006, 73 pages.

(Continued)

*Primary Examiner* — Farhan Syed
(74) *Attorney, Agent, or Firm* — Berkeley Law & Technology Group, LLP

(57) ABSTRACT

The present invention is directed towards systems, methods and computer program products for providing query-based advertising content. According to one embodiment, a method for providing query-based advertising content comprises receiving a web query and generating an ad query associated with the web query, wherein the ad query is generated on the basis of one of a query to advertisement relationship, a query to feature vector relationship, or a rewritten query vector. An advertisement is selected on the basis of the generated ad query.

12 Claims, 5 Drawing Sheets

(56) References Cited

U.S. PATENT DOCUMENTS

| | | | |
|---|---|---|---|
| 6,216,123 B1 | 4/2001 | Robertson et al. | |
| 6,223,171 B1* | 4/2001 | Chaudhuri et al. | 707/718 |
| 6,223,342 B1* | 4/2001 | George | 717/116 |
| 6,240,423 B1* | 5/2001 | Hirata | 1/1 |
| 6,347,313 B1 | 2/2002 | Ma et al. | |
| 6,564,213 B1 | 5/2003 | Ortega et al. | |
| 6,578,022 B1 | 6/2003 | Foulger et al. | |
| 6,675,159 B1 | 1/2004 | Lin et al. | |
| 6,859,802 B1* | 2/2005 | Rui | 1/1 |
| 6,876,997 B1 | 4/2005 | Rorex et al. | |
| 6,947,930 B2 | 9/2005 | Anick et al. | |
| 6,981,040 B1 | 12/2005 | Konig et al. | |
| 7,225,182 B2 | 5/2007 | Paine et al. | |
| 7,542,969 B1 | 6/2009 | Rappaport et al. | |
| 7,567,262 B1* | 7/2009 | Clemens et al. | 345/632 |
| 7,599,916 B2* | 10/2009 | Weare | 1/1 |
| 7,620,626 B2* | 11/2009 | Jackson et al. | 1/1 |
| 7,631,008 B2* | 12/2009 | Carson et al. | 705/14.45 |
| 7,739,264 B2 | 6/2010 | Jones | |
| 7,849,076 B2* | 12/2010 | Zheng et al. | 707/715 |
| 7,860,347 B2* | 12/2010 | Tang et al. | 382/305 |
| 7,890,374 B1* | 2/2011 | Khan et al. | 705/26.63 |
| 7,907,755 B1* | 3/2011 | Perlmutter et al. | 382/118 |
| 7,958,130 B2* | 6/2011 | Manolescu | 707/749 |
| 8,051,072 B2* | 11/2011 | Zheng et al. | 707/722 |
| 8,108,413 B2* | 1/2012 | Kar et al. | 707/758 |
| 8,145,656 B2* | 3/2012 | Shatz et al. | 707/758 |
| 8,150,859 B2* | 4/2012 | Vadlamani et al. | 707/748 |
| 8,214,359 B1* | 7/2012 | Gomes et al. | 707/728 |
| 8,233,679 B2* | 7/2012 | Perlmutter et al. | 382/118 |
| 8,326,842 B2* | 12/2012 | Vadlamani et al. | 707/748 |
| 2002/0161747 A1* | 10/2002 | Li et al. | 707/3 |
| 2003/0046161 A1 | 3/2003 | Kamangar et al. | |
| 2003/0046277 A1* | 3/2003 | Jackson et al. | 707/3 |
| 2003/0055816 A1 | 3/2003 | Paine et al. | |
| 2003/0069877 A1 | 4/2003 | Grefenstette et al. | |
| 2003/0126139 A1 | 7/2003 | Lee et al. | |
| 2004/0019581 A1 | 1/2004 | Davis et al. | |
| 2004/0024752 A1 | 2/2004 | Manber et al. | |
| 2004/0181525 A1* | 9/2004 | Itzhak et al. | 707/5 |
| 2005/0015366 A1 | 1/2005 | Carrasco et al. | |
| 2005/0021397 A1* | 1/2005 | Cui et al. | 705/14 |
| 2005/0084154 A1* | 4/2005 | Li et al. | 382/190 |
| 2005/0086223 A1* | 4/2005 | Rui | 707/5 |
| 2005/0131758 A1 | 6/2005 | Desikan et al. | |
| 2005/0137939 A1 | 6/2005 | Calabria et al. | |
| 2005/0187818 A1 | 8/2005 | Zito et al. | |
| 2005/0267872 A1* | 12/2005 | Galai et al. | 707/3 |
| 2006/0010105 A1 | 1/2006 | Sarukkai et al. | |
| 2006/0041607 A1 | 2/2006 | Miller et al. | |
| 2006/0064411 A1 | 3/2006 | Gross et al. | |
| 2006/0206479 A1* | 9/2006 | Mason | 707/5 |
| 2006/0206516 A1 | 9/2006 | Mason | |
| 2006/0248035 A1 | 11/2006 | Gendler et al. | |
| 2006/0253427 A1 | 11/2006 | Wu et al. | |
| 2006/0287919 A1 | 12/2006 | Rubens et al. | |
| 2007/0016473 A1* | 1/2007 | Anderson et al. | 705/14 |
| 2007/0027754 A1 | 2/2007 | Collins et al. | |
| 2007/0027850 A1* | 2/2007 | Chan et al. | 707/3 |
| 2007/0027864 A1 | 2/2007 | Collins et al. | |
| 2007/0027865 A1 | 2/2007 | Bartz et al. | |
| 2007/0027869 A1 | 2/2007 | Collins et al. | |
| 2007/0038602 A1* | 2/2007 | Weyand et al. | 707/3 |
| 2007/0067215 A1* | 3/2007 | Agarwal et al. | 705/14 |
| 2007/0112840 A1* | 5/2007 | Carson et al. | 707/102 |
| 2007/0143278 A1* | 6/2007 | Srivastava et al. | 707/5 |
| 2007/0156887 A1 | 7/2007 | Wright et al. | |
| 2007/0174258 A1 | 7/2007 | Jones et al. | |
| 2007/0282813 A1 | 12/2007 | Cao et al. | |
| 2007/0288230 A1* | 12/2007 | Datta | 704/9 |
| 2007/0288448 A1* | 12/2007 | Datta | 707/5 |
| 2007/0288449 A1* | 12/2007 | Datta et al. | 707/5 |
| 2007/0288450 A1* | 12/2007 | Datta et al. | 707/5 |
| 2008/0077570 A1 | 3/2008 | Tang et al. | |
| 2008/0154738 A1 | 6/2008 | Jain et al. | |
| 2008/0154886 A1* | 6/2008 | Podowski et al. | 707/5 |
| 2008/0208841 A1 | 8/2008 | Zeng et al. | |
| 2008/0256060 A1 | 10/2008 | Chang et al. | |
| 2008/0294524 A1* | 11/2008 | Badros et al. | 705/14 |
| 2009/0006207 A1* | 1/2009 | Datar et al. | 705/14 |
| 2009/0254512 A1* | 10/2009 | Broder et al. | 707/2 |
| 2009/0292677 A1* | 11/2009 | Kim | 707/3 |

OTHER PUBLICATIONS

U.S. Appl. No. 11/432,585: Notice to file missing parts, mailed Jun. 5, 2006, 2 pages.
U.S. Appl. No. 11/432,585: Notice of publication, mailed Feb. 1, 2007, 1 page.
U.S. Appl. No. 11/432,585: Non-Final Office Action, mailed May 12, 2008, 31 pages.
U.S. Appl. No. 11/432,585: Office Action Response, mailed Aug. 12, 2008, 21 pages.
U.S. Appl. No. 11/432,585: Final Office Action, mailed Nov. 13, 2008, 28 pages.
U.S. Appl. No. 11/432,585: RCE, mailed Feb. 13, 2009, 28 pages.
U.S. Appl. No. 11/432,585: Non-Final Office Action, mailed Mar. 5, 2009, 41 pages.
U.S. Appl. No. 11/432,585: Office Action response, mailed Jun. 5, 2009, 18 pages.
U.S. Appl. No. 11/432,585: Final Office action, mailed Aug. 13, 2009, 39 pages.
U.S. Appl. No. 11/432,585: Pre-Appeal Brief request, mailed Jan. 12, 2010, 14 pages.
U.S. Appl. No. 11/432,585: Notice of panel decision from pre-appeal brief, mailed Mar. 24, 2010, 2 pages.
U.S. Appl. No. 11/432,585: Appeal brief, mailed Apr. 22, 2010, 26 pages.
U.S. Appl. No. 11/432,585: Examiner's answer, mailed May 11, 2006, 43 pages.
U.S. Appl. No. 11/432,585: Reply brief, mailed Sep. 7, 2010, 14 pages.
U.S. Appl. No. 11/432,585: Misc. Communication, mailed Oct. 19, 2010, 2 pages.
U.S. Appl. No. 11/432,585: BPAI docketing notice, mailed Oct. 23, 2010, 2 pages.
U.S. Appl. No. 11/598,239: Application as filed on Nov. 9, 2006, 47 pages.
U.S. Appl. No. 11/432,585: Response to notice to file missing parts, mailed Aug. 1, 2006, 17 pages.
U.S. Appl. No. 11/598,239: Notice to file missing parts and filing receipt, mailed Dec. 1, 2006, 5 pages.
U.S. Appl. No. 11/598,239: Notice of abandonment, mailed Aug. 2, 2007, 2 pages.
U.S. Appl. No. 11/598,239: Application as filed on Nov. 15, 2006, 67 pages.
U.S. Appl. No. 11/600,603: Notice to file missing parts, mailed Dec. 8, 2006, 2 pages.
U.S. Appl. No. 11/600,603: Filing receipt, mailed Dec. 8, 2006, 3 pages.
U.S. Appl. No. 11/600,603: Response to notice to file missing parts, mailed Mar. 8, 2007, 13 pages.
U.S. Appl. No. 11/600,603: Updated filing receipt, mailed Mar. 16, 2007, 6 pages.
U.S. Appl. No. 11/600,603: Preliminary amendment, mailed Oct. 29, 2007, 11 pages.
U.S. Appl. No. 11/600,603: Publication notice, mailed May 2, 2008, 6 pages.
U.S. Appl. No. 11/600,603: Non-Final Office Action, mailed Sep. 26, 2008, 18 pages.
U.S. Appl. No. 11/600,603: Response to office action, mailed Dec. 29, 2008, 16 pages.
U.S. Appl. No. 11/600,603: Final office action, mailed Mar. 5, 2009, 17 pages.
U.S. Appl. No. 11/600,603: RCE, mailed Jul. 6, 2009, 20 pages.
U.S. Appl. No. 11/600,603: Non-Final Office Action, mailed Sep. 14, 2009, 18 pages.

U.S. Appl. No. 11/600,603: Amendment, mailed Sep. 14, 2009, 18 pages.
U.S. Appl. No. 11/600,603: Notice of allowance, mailed Apr. 21, 2010, 12 pages.
U.S. Appl. No. 11/600,603: Issue Fee payment, mailed Apr. 30, 2010, 5 pages.
U.S. Appl. No. 11/600,603: Issue notification, mailed May 26, 2010, 1 page.
U.S. Appl. No. 11/830,726: Application as filed, Jul. 30, 2007, 104 pages.
U.S. Appl. No. 11/830,726: Filing receipt, mailed Aug. 13, 2007, 3 pages.
U.S. Appl. No. 11/830,726: Notice of new or revised projected publication date, mailed Sep. 27, 2007, 1 page.
U.S. Appl. No. 11/830,726: Non-Final office action, mailed Jun. 23, 2010, 21 pages.
U.S. Appl. No. 11/830,726: Notice of abandonment, mailed Jan. 28, 2011, 2 pages.
PCT—International Search Report for PCT/US2008/069478, International Filing Date Jul. 9th, 2008, 3 pages.
U.S. Appl. No. 11/598,239, filed Nov. 9, 2006 entitled "System and Method for Generating Substitutable Queries" as filed; 45 pages.

\* cited by examiner

SYSTEMS AND METHODS FOR QUERY EXPANSION IN SPONSORED SEARCH

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is related to the following pending applications, each of which is hereby incorporated herein by reference in its entirety:

U.S. patent application Ser. No. 11/432,585, entitled "SYSTEM AND METHOD FOR DETERMINING SEMANTICALLY RELATED TERM," filed May 11, 2006; and U.S. Pat. No. 11/830,726, entitled, "SYSTEM FOR DETERMINING THE QUALITY OF QUERY SUGGESTIONS USING A NETWORK OF USERS AND ADVERTISERS," filed Jul. 30, 2007

U.S. Pat. No. 11/600,603, entitled "SYSTEM AND METHOD FOR GENERATING SUBSTITUTABLE QUERIES ON THE BASIS OF ONE OR MORE FEATURES," filed Nov. 15, 2006;

U.S. Pat. No. 11/598,239, entitled "SYSTEM AND METHOD FOR GENERATING SUBSTITUTABLE QUERIES," filed Nov. 9, 2006; and U.S. Pat. No. 11/733,630, entitled "SYSTEM AND METHOD FOR UNDERSTANDING THE RELATIONSHIPS BETWEEN KEYWORDS AND ADVERTISEMENTS," filed Apr. 10, 2007.

FIELD OF INVENTION

Embodiments of the invention described herein generally relate to query expansion. More specifically, embodiments of the present invention are directed towards systems, methods and computer program products for expanding an input query utilizing one or more external knowledge sources, a search result set for the input query and one or more other features of the input query in selecting sponsored search advertisements.

BACKGROUND OF THE INVENTION

Since the widespread acceptance of the Internet, advertising as a main source of revenue has proven to be both effective and lucrative. Advertising on the Internet provides the additional benefit of allowing advertisers to more effectively target audiences viewing their advertisements as opposed to traditional print and "hard copy" advertising which constitute a one-way flow of information: advertisers to users.

The business of Web search, a $10 billion industry, relies heavily on sponsored search, which involves displaying one or more selected paid advertisements alongside algorithmic search results. To maximize long-term revenue, the selection of advertisements should be relevant to the user's query. On the other hand, identifying relevant ads is challenging because the typical query is short and also because users, consciously or not, choose terms intended to lead to optimal Web search results and not to optimal ads. Furthermore, the ads themselves are short and usually formulated to capture the reader's attention rather than to facilitate query matching.

Traditionally, the matching of ads to queries has been accomplished by requiring advertisers to pre-define the queries ("bid phrases") for which it would be desirable to display a given ad. This approach, however, restricts the ad distribution to a relatively small set of queries. Accordingly, to go beyond this set while maintaining ad relevancy, systems, methods and computer program products are needed that expand an original query with features prevalent among the returned web search results, rewrites of the original query and other features of the original query, using the expanded query to search an advertisement space.

SUMMARY OF THE INVENTION

The present invention is directed towards systems, methods and computer program products for providing query-based advertising content. A method according to one embodiment of the present invention for providing query-based advertising content comprises receiving a web query and generating an ad query associated with the web query. The ad query is generated on the basis of one of a query to feature vector relationship or a rewritten query vector. An advertisement is selected based on the generated ad query. According to certain embodiments, the method may comprise mapping a query to advertisement relationship that associates the web query with one or more advertisements and selecting the one or more advertisements upon receipt of the web query.

A query to feature vector relationship may comprise querying a feature vector data store comprising one or more feature vectors. The feature vector data store may be generated during an offline process and comprise feature vectors generated through rewriting of a plurality of cached queries. The feature vector data store may also comprise feature vectors generated through analyzing one or more search results associated with one or more cached queries, as well as feature vectors generated using ancillary features associated with a cached query, which according to one embodiment comprise proper noun analysis of a cached query. Additionally, selecting an advertisement may comprise selecting one or more advertisements according to a predetermined advertisement selection scheme.

A system according to one embodiment of the present invention for providing query-based advertising content comprises a sponsored search module operative to receive a web query, a feature generator operative to generate one or more feature vectors, a query to advertisement cache operative to maintain one or more advertisements on the basis of on one of a query to advertisement relationship and a query to feature cache operative to maintain an ad query on the basis of a query to feature vector relationship. According to the present embodiment, the system also comprises an online query expansion module operative to generate an ad query on the basis of a rewritten query vector and an inverted ad index operative to select a plurality of advertisements based on the generated ad query.

According to one embodiment, a query to advertisement relationship comprises associating a web query with one or more advertisements. The query to feature cache may comprise a feature vector data store comprising one or more feature vectors, which may be generated during an offline process. The feature vector data store may comprise one or more feature vectors generated through a rewriting of one or more cached queries, as well as feature vectors generated through an analysis of one or more search results associated with one or more cached queries or ancillary features associated with one or more cached queries, which may comprise a proper noun analysis of the one or more cached queries. Selecting an advertisement may comprise selecting one or more advertisements according to a predetermined advertisement selection scheme.

One embodiment of the present invention also comprises Computer readable media comprising program code for execution by a programmable processor that instructs the processor to perform a method for providing query-based advertising content. The computer readable media according to the present embodiment comprises program code for receiving a web query and program code for generating an ad query associated with the web query, wherein the ad query is generated on the basis of on one of a query to advertisement relationship, a query to feature vector relationship, or a rewritten query vector. The present embodiment also comprises program code for selecting an advertisement based on the generated ad query.

According to one embodiment, the computer readable media maintains a query to advertisement relationship that comprises associating a web query with one or more advertisements. The computer readable media may maintain a query to feature vector relationship that comprises querying a feature vector data store comprising one or more feature vectors, which may be generated during an offline process. The feature vector data store may comprise feature vectors generated through rewriting of a plurality of cached queries, through analyzing one or more search results associated with one or more cached queries or through the use of ancillary features associated with a cached query, which may comprise a proper noun analysis of a cached query. The computer readable for selecting an advertisement may also comprise computer readable media for selecting one or more advertisements according to a predetermined advertisement selection scheme.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and is shown by way of illustration specific embodiments in which the invention may be practiced. It is to be understood that other embodiments may be utilized and structural changes may be made without departing from the scope of the present invention.

Figure 1:
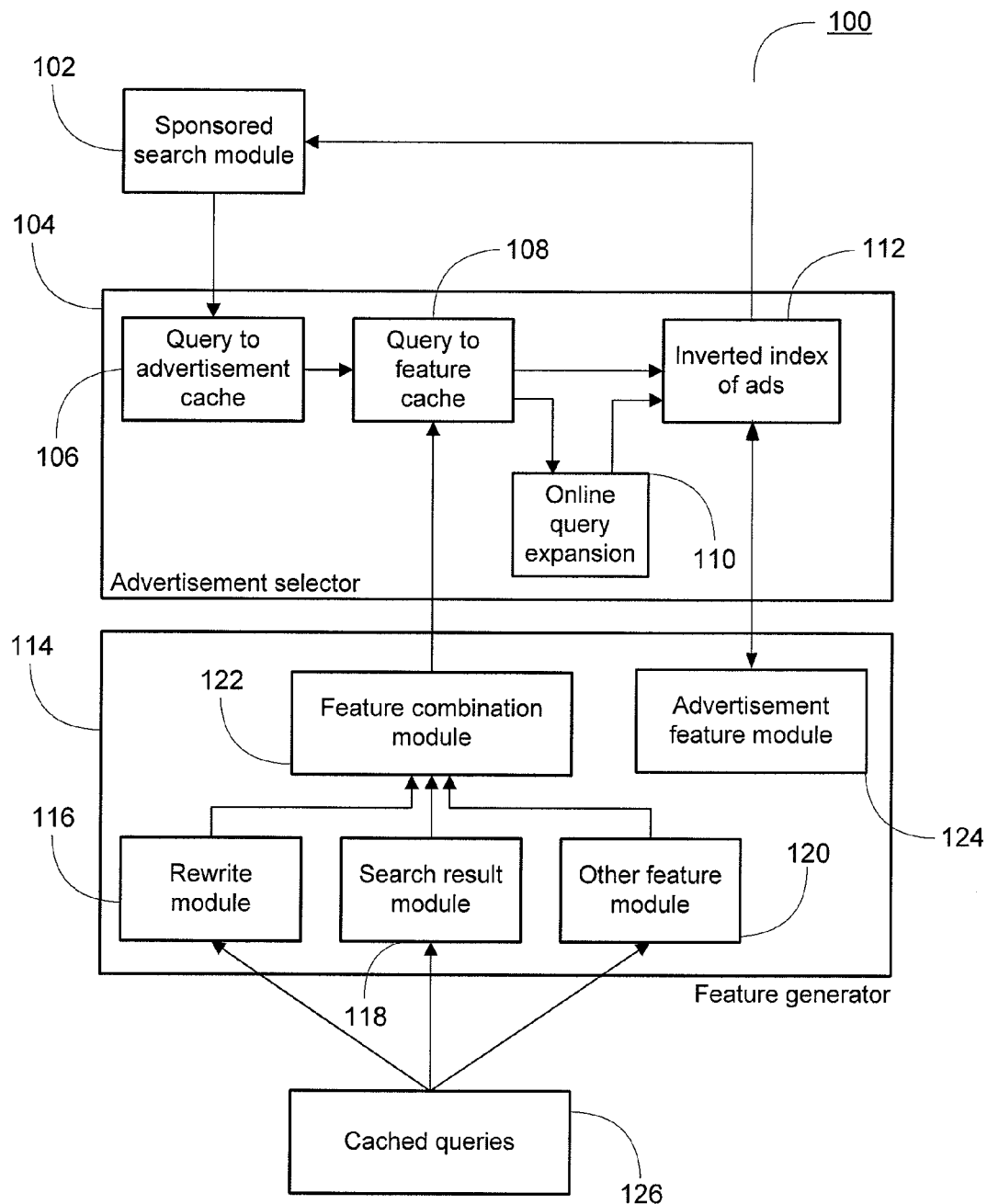
FIG. 1 presents a block diagram depicting a system for expanding web queries for use in sponsored search applications according to one embodiment of the present invention.

FIG. 1 presents a block diagram depicting a system for providing query-based advertising content according to one embodiment of the present invention. As FIG. 1 illustrates, the exemplary system 100 comprises a sponsored search module 102 that is in communication with an advertisement selector 104. In the illustrated embodiment, advertisement selector 104 comprises a query to advertisement cache 106 coupled to a query to feature cache 108. Additionally, query to feature cache 108 is communicatively coupled to inverted ad index 112, an online query expansion module 110 and feature generator 114. The feature generator 114 may comprise a feature combination module 122 coupled to rewrite module 116, a search result module 118 and one or more other feature module(s) 120 that, in turn, are operative to receive data from a cached queries data store 126. Feature generator 114 may also comprise an advertisement feature module 124 operative to transmit data to the advertisement selector 104.

In the embodiment that FIG. 1 illustrates, the sponsored search module 102 may comprise a server device that is operative to receive requests for content from a plurality of users (not shown). In an alternative embodiment, sponsored search module 102 may be further operative to receive requests from a plurality of software components (not shown), which may be server-side software components. For example, the sponsored search module 102 may be operative to receive a request for advertisements from a user directly, or from a search module operative to perform additional search related tasks (e.g., retrieving search results) in addition to transmitting an advertisement request to sponsored search module 102. In both embodiments, data that the sponsored search module 102 receives may comprise a user query, which may be entered, for example, through a form field presented on a search engine web page.

The sponsored search module 102 may be operative to transmit the received user queries to query to advertisement cache 106. In one embodiment, query to advertisement cache 106 comprises an indexed cache operative to associate an incoming query (also referred to as a "web query") with one or more advertisements. For example, popular user queries such as "World Cup" or "Red Sox" may be associated with one or more advertisements indexed in the query to advertisement cache 106. If the query to advertisement cache 106 maintains a match, the query to advertisement cache 106 may return one or more advertisements to the sponsored search module 102. Alternatively, or in conjunction with the foregoing, the query to advertisement cache 106 may transmit the received query to an inverted ad index 112 for subsequent processing, as is described in greater detail herein.

Alternatively, or in conjunction with the foregoing, one or more advertisements associated with the web query may not be located or otherwise identified within the query to advertisement cache 106. For example, more complex queries (or less popular queries) that are not associated with advertisements may be forwarded from the query to advertisement cache 106 to the query to feature cache 108. In the embodiment that FIG. 1 illustrates, the query to feature cache 108 is operative to attempt to locate a feature vector associated with the web query, a given feature vector received from the feature generator 114, as is described in greater detail herein.

The feature generator 114 is operative to examine cached queries 126 and generate one or more feature vectors for association with a given one of the cached queries. In the illustrated embodiment, rewrite module 116 may be operative to first analyze a query from the cached queries 126 and generate a feature vector based upon query rewriting. For example, rewrite module 116 may be operative to examine a cached query and generate a feature vector by rewriting terms within the cached query. For example, the rewrite module 116 may replace, append or delete terms from an original cached query to generate a more robust rewrite of the cached query for use in generating feature vector associated with the query. Additionally, rewrite module 116 may be operative to remove terms deemed unnecessary to the query (e.g., stopwords, redundant terms, etc).

The feature generator 114 also contains a search result module 118 operative to retrieve cached queries 126 and generate a feature vector based upon search results associated with the cached query. In one embodiment, the search result module 118 may be operative to determine features for a given cached query on the basis of a top N number of web search results associated with the given query. In this embodiment, the N number of results may be pre-determined by the system. For example, for a given cached query, the content of the top 40 search results may be used to generate a feature vector for association with the given query. In one embodiment, a feature vector may comprise the top M terms occurring within the top N documents, wherein M may also pre-determined within the system.

The feature generator 114 may further comprise another feature module 120 operative to generate a feature vector for cached queries 126 on the basis of one or more ancillary features. In one embodiment, ancillary features may comprise extracting predetermined terms from cached queries 126 and generating features based on the predetermined terms. For example, the other feature module 120 may extract proper nouns such as locations or names of individuals and generate a feature vector on the basis of knowledge regarding the proper nouns. In an alternative embodiment, the other feature module 120 may utilize other databases for generating a feature vector for a given cached query 126, such as a user interaction database.

The rewrite module 116, search result module 118 and other feature module 120 are operative to transmit feature vectors to a feature combination module 122. In the embodiment that FIG. 1 illustrates, three feature vectors, each vector associated with modules 116, 118 and 120 are received for a given cached query 126. The feature combination module 122 may be operative to receive the feature vectors and generate a final feature vector associated with a given cached query 126. In a first embodiment, generating a final feature vector may comprise weighting the plurality of features stored within the received feature vectors and selecting a plurality of features based on the weighting. Similarly, individual components with the rewrite module 116, search result module 118 and other feature module 120 may be assigned different weights, e.g., where the rewrite module utilizes multiple underlying query rewriting systems, the feature combination module 122 may assign a particular weight to the output of a given query rewriting system. In an alternative embodiment, manual tuning may be utilized to adjust the method of selecting output features of the feature combination module 122. In yet another embodiment, weights utilized by the system 100 may be tuned automatically.

Returning to the advertisement selector 104, the query to feature cache 108 according to one embodiment is operative to store a pair comprising one or more feature vectors in association with a query, which the query to feature cache 108 receives from the feature generator 114. In accordance with the present embodiment, the advertisement selector 104 receives the web query and examines the query to feature cache 108 to determine if a feature vector exists for the web query. If so, query to feature cache 108 transmits the feature vector to the inverted ad index 112. If not, query to feature cache forwards the query to the online query expansion module 110. In the illustrated embodiment, the online query expansion module 110 may be operative to rewrite the original query for use in generating feature vector used to access the inverted index of ads 112.

The feature generator 114 may further comprise an advertisement feature module 124 operative to analyze one or more advertisements and generate a feature vector for association with a given advertisement. In one embodiment, generating a feature vector may comprise analyzing textual data associated with an advertisement and extracting one or more terms associated with a given advertisement. The advertisement feature module 124 may be operative to transmit a plurality of feature vectors—advertisement pairs to the inverted index of ads 112. The inverted index of ads 112 may receive a feature vector from query to advertisement cache 106, query to feature cache 108 or online query expansion module 110 and may compare the received feature vector to stored feature vectors for advertisements, returning one or more advertisements matching the received feature vector.

The inverted index of ads 112 may select one or more advertisements on the basis of a pre-determined ranking scheme. For example, the inverted index 112 may select the top five advertisements associated with a received feature vector and may forward those advertisements to sponsored search module 102. In the illustrated embodiment, the sponsored search module 102 may be operative to combine incoming advertisement data within the context of a search engine results page. In one embodiment, inverted index of ads 112 may additionally be operative to cache a plurality of ads associate with a given query for subsequent retrieval to enhance the overall all speed of the system 100.

Figure 2:
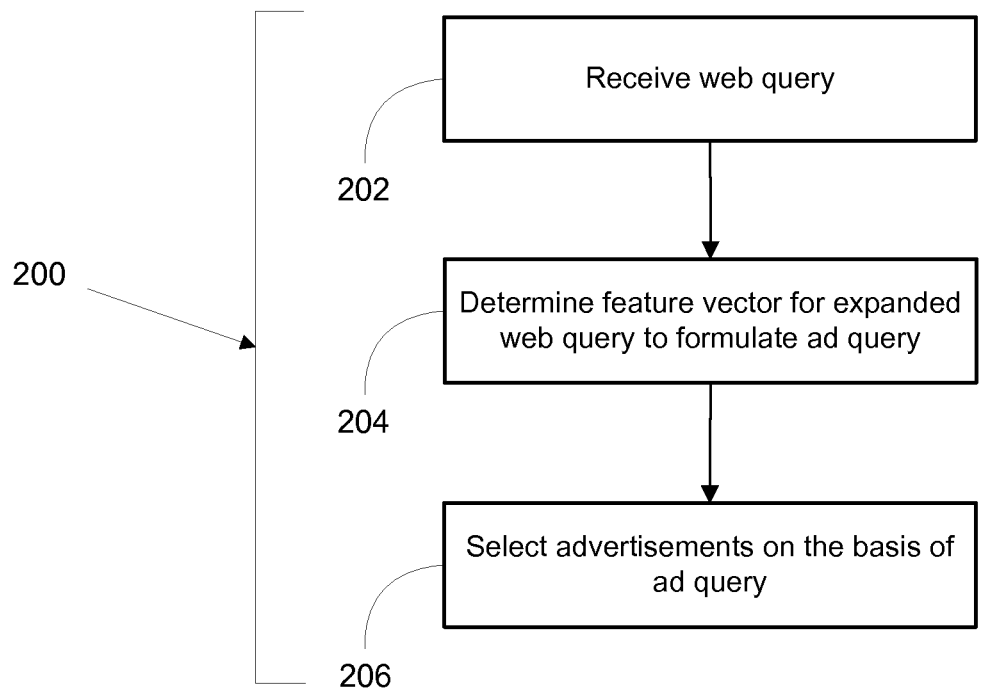
FIG. 2 presents a flow diagram illustrating a method for expanding a query for the selection of sponsored search advertisements according to one embodiment of the present invention.

FIG. 2 presents a flow diagram illustrating a method for expanding a query for the selection of sponsored search advertisements according to one embodiment of the present invention. As FIG. 2 illustrates, the method 200 receives a web query, step 202. In one embodiment, a web query may be received from a form element allowing a user to enter free-form text into a web page and submit the request to a search engine via an HTTP request.

The method 200 receives the web query and determines a feature vector for am expanded web query to formulate an ad query, step 204. As previously described, determining a feature vector for an expanded web query may comprise generating a feature vector based on a plurality of feature vectors, as is described herein with respect to FIG. 3. Briefly, the method 200 may execute a plurality of vector generation techniques, combining the results to generate a final feature vector that represents an ad query.

The method 200 may then select one or more advertisements on the basis of the ad query, step 206. In the embodiment that FIG. 2 illustrates, selecting advertisements may comprise comparing the ad query to one or more feature vectors associated with one or more advertisements. In one embodiment, the method 200 may select advertisements on the basis of a relevancy match between the ad query and the advertisement feature vectors.

Figure 3:
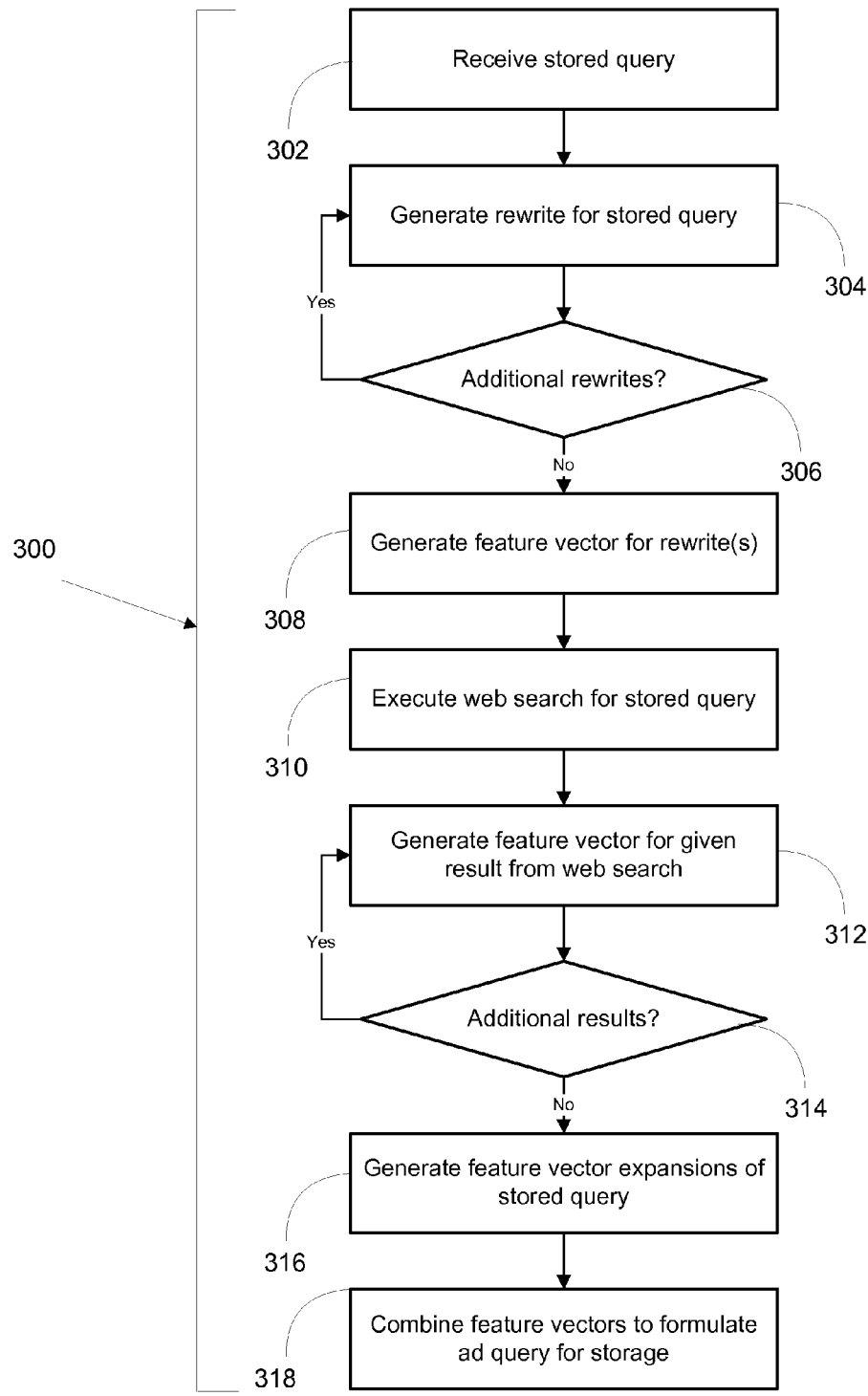
FIG. 3 presents a flow diagram illustrating a method for generating a feature vector for a cached query according to one embodiment of the present invention.

FIG. 3 presents a flow diagram illustrating a method for generating a feature vector for a cached query according to one embodiment of the present invention. As FIG. 3 illustrates, the method 300 receives a stored query, step 302. In one embodiment, receiving a stored query may comprise accessing a query log database containing a plurality of previously entered queries. The method 300 may then generate a rewrite for the stored query, step 304. In one embodiment, a rewrite may comprise modifying the stored query according to a set of rules. For example, rewriting a query may comprise replacing, adding or deleting terms from the original stored query.

The method 300 checks to determine if additional rewrites are available for the stored query, step 306. If additional rewrites are available, the method 300 generates the additional rewrites in step 304. If not, the method 300 generates a feature vector for the generated rewrites, step 308. In one embodiment, generating a feature vector for a plurality of rewrites may comprise extracting a plurality of terms common to the generated rewrites. In one embodiment, a feature vector may comprise a list of rewritten terms and a weight associated with a given term. Similarly, terms may be weighted in accordance with a rewrite technique utilized to obtain the rewrite. In an alternative embodiment, rewriting a cached query may be performed recursively, that is, performing additional rewrites to obtain additional material for use in query expansion.

After generating a feature vector for the one or more rewrites, the method 300 may then execute a web search for the stored query, step 310. In the embodiment that FIG. 3 illustrates, executing a web search may comprise performing a web search similar to that performed by a user accessing a search engine, resulting in the retrieval of one or more relevant search results for the stored query. The method 300 may then generate a feature vector for a given result from the web search results, step 312. In one embodiment, generating a feature vector may comprise analyzing data within a search result and populating a feature vector with the most relevant terms found within the search result. The method 300 then determines if additional results remain in the result set, step 314. In one embodiment, a determination of additional results may comprise analyzing the top N returned search results from a search results set, wherein N may be determined prior to performing the method 300. If additional results remain that require analysis, the method 300 may generate feature vectors for the remaining search results, step 312.

If feature vectors for a result set have been generated on the basis of external knowledge (e.g., rewrite systems), as well as a result set based on the query, the method 300 may generate feature vector expansions of the stored query, step 316. In one embodiment, other features may comprise various ancillary features enabling the generation of a feature vector. For example, the method 300 may extract proper nouns such as locations or names of individuals and generate a feature vector based on knowledge regarding the proper nouns. In an alternative embodiment, the method 300 may utilize other databases for generating a feature vector for a given stored query, such as a user interaction database.

Finally, the method 300 combines the feature vectors to formulate a final, normalized feature vector, e.g., an ad query, for storage, step 318. Combing feature vectors may comprise calculating the most frequently occurring terms occurring within the feature vectors generated in steps 308, 312 and 316. In one embodiment, terms within specific feature vectors may be weighted according to a predetermined weighting scheme. For example, terms within a vector generated in steps 308 and 312 may be weighted higher than those generated in step 316. Additionally, the method 300 stores the final ad query for storage. In one embodiment, storing an ad query for storage may comprise storing the ad query within a database or similar persistent storage device for subsequent retrieval.

Figure 4:
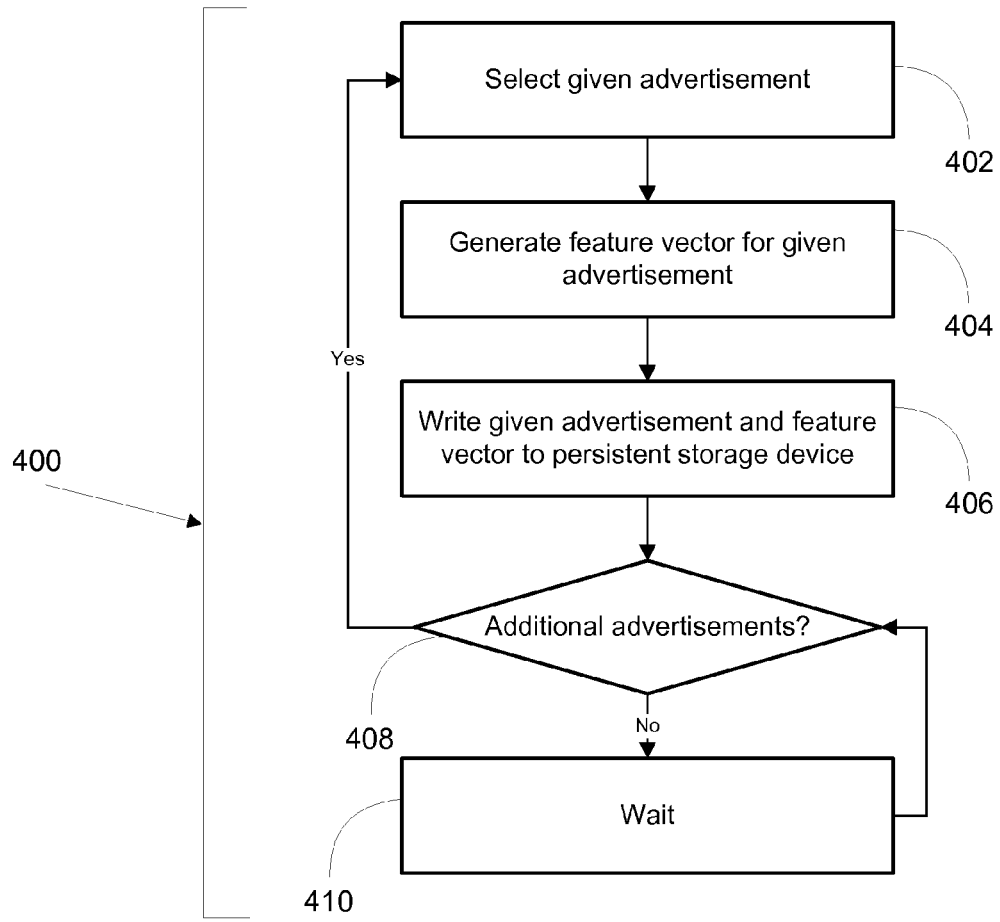
FIG. 4 presents a flow diagram illustrating a method for generating a feature vector for an advertisement according to one embodiment of the present invention.

FIG. 4 presents a flow diagram illustrating a method for generating a feature vector for an advertisement according to one embodiment of the present invention. As FIG. 4 illustrates, the method 400 selects a given advertisement, step 402. In the illustrated embodiment, an advertisement may comprise textual, graphical or video elements transmitted by an advertiser to an advertisement provider.

The method 400 then generates a feature vector for the selected advertisement, step 404. Generating a feature vector for a selected advertisement may comprise analyzing textual data associated with a given advertisement and extracting a subset of the textual data for incorporation in a feature vector. In an alternative embodiment, generating a feature vector for a given advertisement may further comprise analyzing non-textual data such as graphical or video data and generating a textual feature vector associated with the non-textual data. Additionally, or in conjunction with the foregoing, the method 400 may further analyze hyperlinked resources associated with a given advertisement, as well as previously retrieved data associated with an advertisement or advertiser.

The method 400 may write the given advertisement and feature vector to a persistent storage device, step 406. If additional advertisements are available for analysis, step 408, the subroutine performed in steps 402, 404 and 406 repeats for the remaining advertisements. If no advertisements remain that require analysis, the method 400 waits until the receipt of additional advertisements, step 410, and analyzes the incoming advertisements upon receipt.

Figure 5:
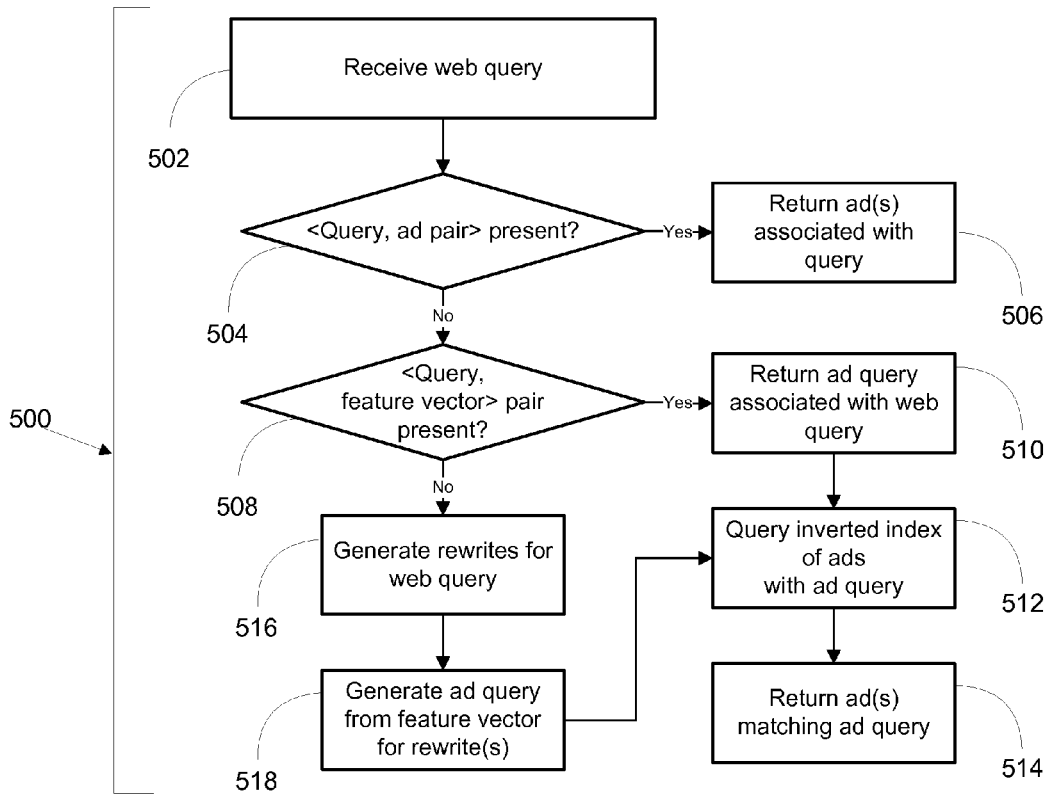
FIG. 5 presents a flow diagram illustrating a method for selecting one or more advertisements in response to receipt of a query according to one embodiment of the present invention.

FIG. 5 presents a flow diagram illustrating a method for selecting one or more advertisements in response to receipt of a query according to one embodiment of the present invention. As illustrated, the method 500 receives a web query, step 502. In one embodiment, a web query may comprise textual data entered into a search form located on a search engine web page.

The method 500 checks to determine if a <query, ad> pair is present, step 504. If the <query, ad> pair is present, the method returns one or more advertisements associated with the query, step 506. In one embodiment, a user query may match an existing <query, ad> pair and, thus, a plurality of predetermined ads may be returned in response to the user query. A <query, ad> pair may be present for popular queries so that top quality advertisements may be retrieved immediately for popular queries.

If a <query, ad> pair is not present, the method 500 determines if a <query, feature vector> pair is present, step 508. If <query, feature vector> pair is present, the method returns an ad query associated with the web query, step 510. As previously described, generating an ad query may comprise querying a feature vector store for a feature vector that corresponds to the user query. In accordance with one embodiment, a feature vector store may comprise feature vectors generated in the offline process described with respect to FIG. 3.

If a <query, feature vector> pair is not present, the method 500 generates rewrites for the web query, step 516, generating an ad query from the feature vector for the rewrite, step 518. In this step, the method 500 may determine that feature vectors associated with the query have not been generated during the offline process described in conjunction with in FIG. 3, therefore the method 500 generates one or more re-written queries for the web query and an associated ad query in real time for the web query.

The method 500 uses the selected ad query to query an inverted index of advertisements, step 512, returning one or more advertisements that match the ad query. In accordance with one embodiment, selecting advertisements may comprise comparing the ad query to a plurality of feature vectors associated with a plurality of advertisements. In one embodiment, the method 500 may select a top plurality of advertisements based on the relevancy match between the ad query and the advertisement feature vectors. The method 500 then returns the advertisements matching the ad query, step 514. In an alternative embodiment, the method 500 may further be operative to cache ad queries associated with a given query.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A computerized method for providing query-based advertising content, the method comprising:

electronically, via a processing device, receiving a web query from a client device coupled to the processing device over a network;

electronically, via the processing device, generating one or more web query feature vectors based upon a rewrite of one or more terms of the web query;

electronically, via the processing device, generating an ad query associated with the web query, wherein the ad query is generated on the basis of the one or more web query feature vectors;

electronically, via the processing device, retrieving a plurality of advertisements based on the generated ad query;

generating a plurality of advertisement feature vectors associated with the plurality of advertisements;

comparing the ad query with the plurality of advertisement feature vectors;

selecting one or more advertisements from the plurality of advertisements based on a relevant match between the ad query and the plurality of advertisement feature vectors;

comparing a query to feature vector relationship with a store of feature vectors associated with the one or more advertisements, comprising generating a rewritten feature vector by rewriting one or more cached queries;

generating a search feature vector by selecting a top N number of one or more search results associated with the cached queries; and generating an ancillary feature vector using ancillary features associated with the cached queries, wherein the ancillary features comprise predetermined terms or proper nouns extracted from the cached queries, wherein the cached queries are obtained from a database containing log of past queries; and returning the one or more advertisements based on a comparison of the rewritten feature vector, search feature vector, and ancillary feature vector to the store of feature vectors associated with one or more advertisements.

2. The method of claim 1 wherein the query to feature vector relationship comprises one or more feature vectors generated through rewriting of a plurality of cached queries, wherein the one or more feature vectors comprises a list of rewritten terms and a weight associated with each term and returning the one or more advertisements based on a comparison of the rewritten feature vector, search feature vector, and ancillary feature vector to the store of feature vectors associated with one or more advertisements.

3. The method of claim 1 further comprising generating an ad query based on the query to feature vector relationship comprises combining the rewritten feature vector, search feature vector, and ancillary feature vector using a weight assigned to at least one of the rewritten feature vector, search feature vector, and ancillary feature vector.

4. The method of claim 1 wherein selecting an advertisement comprises selecting one or more advertisements according to a predetermined advertisement selection scheme.

5. A computerized system comprising at least one processing device coupled to at least one client device over a network, the at least processing device operable at least to:
  receive a web query;
  generate one or more web query feature vectors based upon a rewrite of one or more terms of the web query;
  generate an ad query associated with the web query, wherein the ad query is generated on the basis of the one or more web query feature vectors;
  retrieve a plurality of advertisements based on the generated ad query;
  generate a plurality of advertisement feature vectors associated with the plurality of advertisements;
  compare the ad query with the plurality of advertisement feature vectors;
  select one or more advertisements from the plurality of advertisements based on a relevant match between the ad query and the plurality of advertisement feature vectors
  compare a query to feature vector relationship with a store of feature vectors associated with the one or more advertisements, the device further operable to
    generate a rewritten feature vector by rewriting one or more cached queries;
    generate a search feature vector by selecting a top N number of one or more search results associated with the cached queries; and
    generate an ancillary feature vector using ancillary features associated with the cached queries, wherein the ancillary features comprise predetermined terms or proper nouns extracted from the cached queries, wherein the cached queries are obtained from a database containing log of past queries; and
  return the one or more advertisements based on a comparison of the rewritten feature vector, search feature vector, and ancillary feature vector to the store of feature vectors associated with one or more advertisements.

6. The system of claim 5 wherein the query to feature vector relationship comprises one or more feature vectors generated through a rewriting of one or more cached queries, wherein the one or more feature vectors comprises a list of rewritten terms and weight associated with each term and return the one or more advertisements based on a comparison of the rewritten feature vector, search feature vector, and ancillary feature vector to the store of feature vectors associated with one or more advertisements.

7. The system of claim 5 wherein to generate an ad query based on the query to feature vector relationship, the processing device combines the rewritten feature vector, search feature vector, and ancillary feature vector using a weight assigned to at least one of the rewritten feature vector, search feature vector, and ancillary feature vector.

8. The system of claim 5 wherein selecting an advertisement comprises selecting one or more advertisements according to a predetermined advertisement selection scheme.

9. A non-transitory computer readable media having computer readable program code embodied therein, the computer readable program code when executed by a processing device causes the processing device to perform a method comprising:
  receiving a web query;
  generating one or more web query feature vectors based upon a rewrite of one or more terms of the web query;
  generating an ad query associated with the web query, wherein the ad query is generated on the basis of the one or more web query feature vectors;
  retrieving a plurality of advertisements based on the generated ad query;
  generating a plurality of advertisement feature vectors associated with the plurality of advertisements;
  comparing the ad query with the plurality of advertisement feature vectors;
  selecting one or more advertisements from the plurality of advertisements based on a relevant match between the ad query and the plurality of advertisement feature vectors;
  comparing a query to feature vector relationship with a store of feature vectors associated with the one or more advertisements, comprising
    generating a rewritten feature vector by rewriting one or more cached queries;
    generating a search feature vector by selecting a top N number of one or more search results associated with the cached queries; and
    generating an ancillary feature vector using ancillary features associated with the cached queries, wherein the ancillary features comprise predetermined terms or proper nouns extracted from the cached queries, wherein the cached queries are obtained from a database containing log of past queries; and
  returning the one or more advertisements based on a comparison of the rewritten feature vector, search feature vector, and ancillary feature vector to the store of feature vectors associated with one or more advertisements.

10. The non-transitory computer readable media of claim 9 wherein the query to feature vector relationship comprises one or more feature vectors generated through rewriting of a plurality of cached queries, wherein the one or more feature vectors comprises a list of rewritten terms and weight associated with each term and returning the one or more advertisements based on a comparison of the rewritten feature vector, search feature vector, and ancillary feature vector to the store of feature vectors associated with one or more advertisements.

11. The non-transitory computer readable media of claim 9 wherein generating an ad query based on the query to feature vector relationship comprises combining the rewritten feature vector, search feature vector, and ancillary feature vector using a weight assigned to at least one of the rewritten feature vector, search feature vector, and ancillary feature vector.

12. The non-transitory computer readable media of claim 9 wherein selecting an advertisement comprises selecting one or more advertisements according to a predetermined advertisement selection scheme.

* * * * *